Sept. 9, 1941.   M. F. PETERS   2,255,569
INDICATING MEANS FOR RADIO LANDING SYSTEMS
Filed Oct. 26, 1938
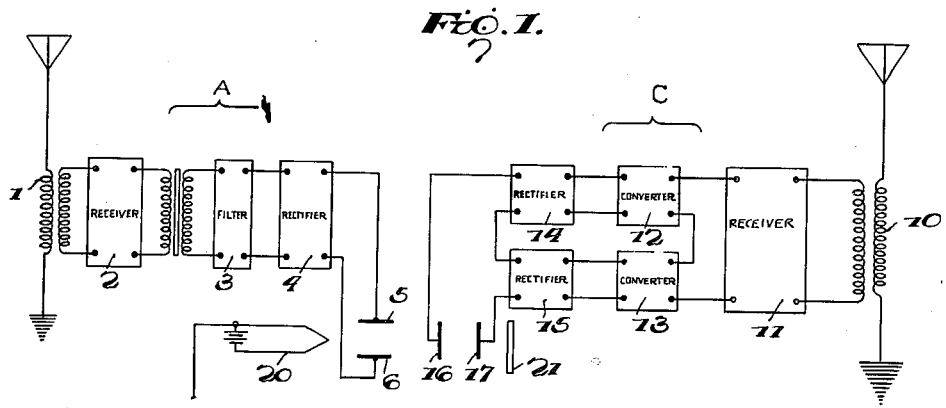
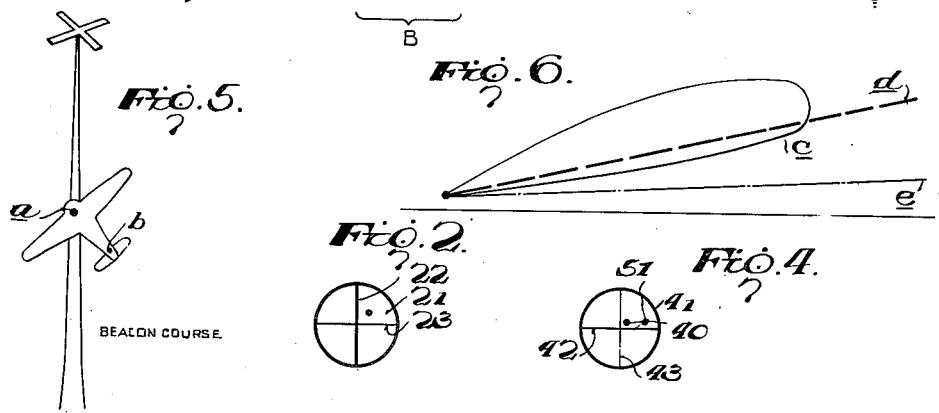
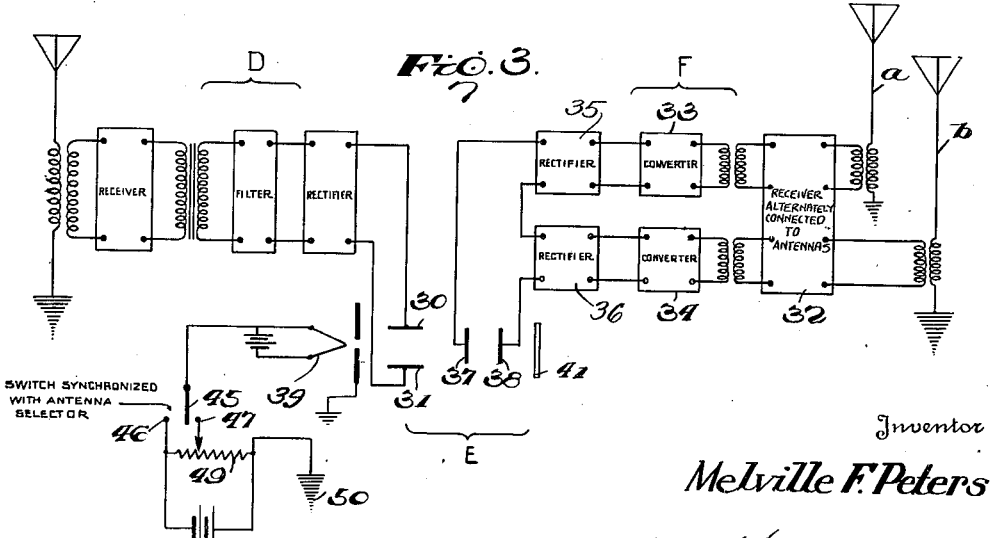
Inventor
Melville F. Peters.
By Samuel Scrivener Jr.
Attorney Patented Sept. 9, 1941

2,255,569

UNITED STATES PATENT OFFICE 2,255,569

INDICATING MEANS FOR RADIO LANDING SYSTEMS

Melville F. Peters, Beltsville, Md., assignor to Washington Institute of Technology, Inc., Washington, D. C., a corporation of Delaware Application October 26, 1938, Serial No. 237,131

3 Claims. (Cl. 250—11)

The present invention relates generally to radio landing systems for aircraft and, more particularly, relates to means for providing an indication on a landing aircraft of the position and heading of the aircraft with respect to the beacons or radiation fields which form the guidance means for the landing operation.

Radio landing systems, of the type generally employed, comprise radiated fields established by transmitting means located on the ground adjacent the landing area and which define courses in space which are followed by the aircraft in landing. Such systems include a runway localizer beacon, which is usually a beacon of the well-known equi-signal type, and which is aligned with the runway to be used in the landing operation, and a second horizontally polarized field which is so radiated as to include a line of constant field intensity which is usually of parabolic shape and which extends from the ground adjacent the transmitting antenna array to a point in space where it may be intercepted by the aircraft. The first-mentioned path, the runway localizer beacon, is followed by the aircraft in order to approach and proceed along the proper runway, while the second path, which is usually referred to as the landing beam, is followed by the aircraft from an elevated point in space to the ground. It will be apparent that by following these two intersecting paths the aircraft will be guided to a proper landing.

It has heretofore been proposed, and is now well-known, to provide a single indicating instrument having two intersecting pointers movable over the face thereof, one of which is responsive to energy received from the radiated fields establishing the so-called runway localizer beacon and the other of which is responsive to energy received from the radiated fields establishing the so-called landing beam. By a proper control of these indicating pointers they may be made to assume pre-determined positions when the aircraft is in proper position with respect to the two paths in space. By controlling the direction and altitude of the aircraft such that these pointers are maintained in their pre-determined positions, the aircraft may be made to follow the paths to a proper landing.

While it has been found advantageous to combine the indicating pointers referred to into a single instrument, it is still necessary to observe and correlate the positions of both pointers in effecting a landing and it has been found that the work of the pilot has been only slightly decreased by reason of this combination of the indicating means. Further, while the position of the pointer which is responsive to the fields which establish the runway localizer beacon indicates the position of the aircraft with respect to the proper course, it provides no indication whatsoever of the heading of the aircraft with respect to the transmitting point. It is with the primary object of removing these objections to present systems that this invention is concerned.

It is therefore one object of this invention to provide an indicating means which will be operable with a radio landing system of the aforesaid type and which will provide a single indication which will be a function of the position, and in certain cases the heading, of the aircraft with respect to the runway localizer course, and of the position of the aircraft with respect to the path to ground established by the landing beam, to thereby simplify the work of the pilot in landing.

A further object of the invention is to provide receiving and indicating means which will be operable with a radio landing system of the aforesaid character and which will provide, in addition to the positional indications required in the landing operation, an indication of the heading of the aircraft with respect to the source of radiations.

A further object of the invention is to provide a receiving and indicating means operable with a radio landing system and in which the received radiations will operate a visual indicating means such as a cathode ray tube to provide an indication upon the screen thereof of the position, and in certain cases the heading, of the landing aircraft.

Other objects and features of novelty will be apparent from the following description and the annexed drawing. It will be understood, however, that such description and drawing are only illustrative of the invention and that the same is not in any way limited thereby, or otherwise than by the appended claims.

Referring to the drawing, in which similar reference numerals refer to like parts:

Fig. 1 is a circuit diagram of a receiving and indicating system according to the present invention and adapted to provide a positional indication;

Fig. 2 is a view showing the screen of a cathode ray oscillograph providing an indication such as might be furnished by the circuit of Fig. 1;

Fig. 3 is a circuit diagram of a receiving and indicating system according to this invention and adapted to provide indications of position and heading;

Fig. 4 is a view, similar to Fig. 2 but showing indications as might be provided by the circuit of Fig. 3;

Fig. 5 is a diagrammatic view showing the position of an aircraft with respect to a beacon course in order to provide the indication illustrated in Fig. 4; and Fig. 6 is a diagrammatic view showing posible paths followed by an aircraft with respect to the path provided by the landing beam.

As stated hereinbefore, it is intended by the present invention to provide a receiving and indicating means which may be carried by an aircraft and which will be operable by the received energy due to the various radiated fields comprising a radio landing system to provide a single indication of the position, and in certain cases the heading, of the aircraft with respect to the paths in space established by these radiated fields. This single indication is produced, by means according to the present invention, on the screen of a visual indicating device such as a cathode ray tube, where the single indication and its position with respect to reference lines on the screen may be observed by the pilot. In the preferred embodiment of the invention reference lines are so positioned on the screen that the position of the single indication with respect to them will provide an indication of the position of the aircraft with respect to the paths comprising the landing system.

In Fig. 1 of the drawing there is disclosed a circuit which is adapted to provide an indication of the position of the aircraft with respect to the runway localizer beacon and the landing beam of a radio landing system. Referring to this figure, it will be seen that means, denoted generally at A, have been provided for receiving the radiations establishing the line of constant field intensity in space which provides the landing path to earth, and for supplying a direct current resulting from such received energy to one set of plates of a cathode ray tube which is denoted generally at B. There is also provided in this circuit arrangement a means, denoted generally at C, for receiving the radiated fields establishing the runway localizer beacon and for supplying a direct current resulting from such received radiations, to the second set of plates of the cathode ray tube.

The means A which are responsive to the radiated field establishing the line of constant field intensity providing the landing beam, comprise an antenna 1 which is properly connected to supply received radiations to a receiver 2, the output of which is supplied to a filter 3 which is tuned to the modulation frequency of the radiated field establishing the landing beam. The alternating current output of the filter 3 is supplied to a rectifier 4, and the current output of this rectifier will be a direct current which will fluctuate in accordance with the strength of the radiations received by the antenna 1. This fluctuating direct current is supplied to the two vertically separated plates 5, 6 of the oscillograph device B.

The means C which are responsive to the radiated fields establishing the equi-signal beacon which provides the runway localizer course comprises an antenna 10 which is properly connected to a receiving device 11. The output of the receiver comprises an alternating current which includes components of the modulation frequencies of the two radiated fields which establish the runway localizer course. The receiver output is supplied to two tuned means, such as the reed converter devices 12, 13, which are operable to separate the currents of the two different modulation frequencies and to separately supply to the rectifying devices 14, 15 currents which are respectively proportional in amplitude to the two component currents which have been separated as described. The operation of the converter devices 12, 13 is well-known and is such that the alternating currents appearing in the output circuits of these devices will oscillate at the frequencies of the two modulations impressed on the fields establishing the localizer beacon and will be proportional in strength to the respective strengths of these fields at the point where the antenna 10 is located. The direct currents produced by the rectifiers 14, 15 are supplied to the horizontally separated plates 16, 17 of the oscillograph B.

In the operation of the circuit disclosed in Fig. 1 the direct current output of the rectifier 4 will fluctuate in accordance with variations in the strength of the signals received by antenna 1 and will therefore fluctuate in accordance with variations of the position in space of the aircraft carrying antenna 1 with respect to the line of constant field intensity $c$, which is established by the radiated field to which the receiver 2 is tuned. There will therefore be set up between the plates 5, 6 of the oscillograph a potential difference which will be proportional at all times to the position of the aircraft with respect to the line of constant field intensity and the current flow caused thereby will be in a direction dependent upon such position. Thus, the initial adjustment of the circuit is such that when the aircraft is in the line of constant field intensity the potential difference between plates 5 and 6 will be such that the indication produced by the oscillograph will be in the horizontal line 23. In the event that the air craft is directed above the line of constant field intensity, for example along the path $d$ in Fig. 6, the potential difference between the plates will increase and the indication will move away from the horizontal line 23, preferably upwardly. Navigation of the aircraft below the line C will cause the potential difference between the plates to decrease, thereby causing the indication to be moved in an opposite direction from the horizontal line.

The output of the rectifiers 14, 15 will consist of a direct current which fluctuates in accordance with the difference between the strengths of the radiated fields establishing the runway localizer beacon and which are transmitted at a radio frequency to which the receiver 11 is tuned. Thus, if these two radiated fields are modulated at 86 cycles and 67 cycles, respectively, and if the position in space of the aircraft carrying antenna 10 is such that the 86 cycle modulation is stronger than the 67 cycle modulation, then plate 16 of the oscillograph will be positive and a current proportional to the difference in the strengths of the two modulated fields at the location of antenna 10 will flow from plate 16 to plate 17. If the field modulated at 67 cycles is stronger at the location of the antenna 10 than that modulated at 86 cycles, then the plate 17 of the oscillograph will be positive and a current will flow in the opposite direction between the plates 16, 17.

As is well-known, the cathode ray tube comprises a filament 20 which projects a cathode ray or beam upon a tracing space 21, which may be an observing screen, and such ray or beam is adapted to be deflected by deflecting means such, for example, as voltages impressed on the deflecting plates 5, 6 and 16, 17. In this manner, points of light or curves may be produced on the screen 21 and will occupy a position or have such a shape as will be a function of the voltages existing between the plates 5, 6 and between the plates 16, 17. Thus, if no voltages exist between the plates of the two sets of plates, there will be no deflection of the ray emitted by the filament 20 and under these conditions a spot of light will appear in the center of the screen 21. This screen may be marked with a diametrical vertical line 22 and a diametrical horizontal line 23 as illustrated in Fig. 2, and it will be seen that under the conditions of no voltage as set forth above, the spot of light will appear on the screen 21 at the point of intersection of these lines. If a voltage drop exists between the plates 5, 6 such that the current flow is from plate 6 to plate 5, the cathode ray will be deflected in such a way that the spot of light will appear above the horizontal line 23 and on the vertical line 22. Further, if there is a difference in potential between the plates 16, 17 and the current flow between these plates is from plate 16 to plate 17, the spot of light will be deflected to the right of line 22. Under these conditions, the spot will appear above the line 23 and to the right of the line 22 as illustrated in Fig. 2. If the pilot observes the spot of light in this position, he will know that the aircraft is above the proper line of constant field intensity and to the right of the equi-signal zone defining the runway localizer course and must therefore be guided to the left and downwardly until the potential differences between the plates 5, 6 and 16, 17 return to zero, in which case the spot of light will return to the point of intersection of the lines 22, 23. When this occurs, the pilot will know that the aircraft is on proper course with respect to both of the paths of the landing system and that if this position of the spot of light is maintained, a proper landing will be made.

It will be apparent that the described circuit and apparatus will be effective to produce a single indication of the position of the aircraft with respect to the two paths making up the landing system, and that the provision of such a single indication will greatly simplify the work of the pilot in navigating the aircraft along the paths of the landing system to a proper landing.

In Fig. 3 of the drawing there is disclosed a form of the invention in which an indication of the heading of the aircraft with respect to the source of radiations is provided in addition to the indication of position with respect to the two paths. It will be observed that the indication of position with respect to the equi-signal zone of a guidance beacon, as provided by nearly all known devices, gives no indication of heading. This is due to the fact that the positional indication provided by such known systems is a function only of the relative field strengths at the point where the receiving and indicating means is located. Thus, as illustrated in Fig. 5 of the drawing, if the aircraft illustrated carried only the antenna a, an on-course indication with respect to the beacon course would be provided, inasmuch as the antenna a is within the equi-signal zone, although the heading of the aircraft is not directly toward the source of radiations. It often occurs that, due to crosswinds, an aircraft will "crab" along a course in the manner shown, always following the proper course, although never having a heading directly toward the beacon. By the system illustrated in Fig. 3 there is provided an indication of the heading, as well as of the position, of the aircraft, whereby a constant correct positional and heading orientation of the aircraft may be maintained.

The system disclosed in Fig. 3 is basically similar to that illustrated in Fig. 1 and comprises a means, designated generally by D for receiving the radiations establishing the landing beam, filtering these, rectifying the received current and supplying the resultant direct current to one set of plates 30, 31 of a cathode ray tube E. The means D corresponds in every way with the means A of Fig. 1 and will not be further described.

Means denoted generally at F in Fig. 3 are provided in this embodiment of the invention for alternately supplying to the second, or horizontally separated, plates of the oscillograph E, a current which is proportional to the relative strengths of the radiated fields establishing the runway localizer beacon at one point in space which is located on the aircraft and a second current which is proportional in strength to the two said fields at a second point in space which is also located on the aircraft and which is separated from the first point and spaced longitudinally therefrom on the aircraft. At one of these points there is located the antenna a, as illustrated in Figs. 3 and 5 and at the second, longitudinally separated point, there is located a second antenna b. These antennas are adapted to alternately supply energy received from the two radiated fields to the plates 37, 38 of the cathode ray tube through a receiving and switching device 32, the output of which is supplied to the two tuned devices 33, 34 which supply alternating current at the respective modulation frequencies of the two fields to the rectifying devices 35, 36. The direct current output of these rectifiers is supplied to the plates 37, 38 of the tube E.

Each of the antennas a, b receives energy from both of the radiated fields defining the equisignal zone which provides the guidance means in the horizontal plane. These antennas a, b, being spaced longitudinally of the aircraft as indicated in Fig. 5, will each receive the same amount of energy from the respective radiated fields only when the aircraft is headed toward the source of radiations. However, if the aircraft is not headed toward the source of radiations, as illustrated in Fig. 5, it will be apparent that the signal strengths of each of the two radiated fields will be different at the locations of the two antennas and that in this event unequal currents from both of the radiated fields will be produced in the receiving device.

The antennas a, b are both connected to supply received energy to the receiving and switching device 32. This device includes means for alternately supplying to two mechanically or electrically tuned devices 33, 34 currents due respectively to the radiations received by the antennas a, b. Thus, at one instant the receiver will supply to both converters 33, 34 current due to energy received by antenna a, and at the next instant will supply to the converters 33, 34 current due to energy received by antenna b. The two converters 33, 34 respectively supply alternating current at the modulation frequencies of the two radiated fields to two rectifiers 35, 36, the direct current outputs of which are supplied to the two horizontally separated plates 37, 38 of the oscillograph.

It will be apparent that there will alternately exist between the plates 37, 38 two voltages which will be respectively proportional to the differences between the strengths of the two radiated fields at the locations of the antennas a, b. The filament 39 of the oscillograph E, in accordance with the well-known operation of such devices, will cause a spot of light 40 to appear on the screen 41 of the tube, as illustrated in Fig. 4, on which screen there are preferably marked a horizontal diametrical reference line 42 and a vertical diametrical reference line 43. The apparatus is so adjusted that in the absence of any deflecting voltages on the plates of the oscillograph the spot of light produced will be positioned at the intersection of the reference lines, 42, 43.

It will be seen that any voltage between the plates 30, 31 will be proportional to the position of the aircraft with respect to the line of constant field intensity c defining the guidance means in the vertical plane and that such voltage will cause a deflection of the spot 40 above or below the horizontal reference line 42, depending upon whether the aircraft is above or below the line of constant field intensity. The spot of light will also be deflected to the right or left of the vertical reference line 43 by the two voltages alternately supplied to the plates 37, 38 in the manner hereinbefore set forth. Thus, it will be seen that at one instant the spot of light 40 will assume a position which will be a function of the voltage between plates 30, 31 and the resultant voltage across plates 37, 38 due to radiations received by the antenna a, and at the next instant the spot 40 will assume a position which will be dependent upon the voltage across plates 30, 31 and the resultant voltage across plates 37, 38 due to radiations received by antenna b. It will be apparent that if the aircraft is so oriented with respect to the beacon that a line through the antennas a, b passes through the beacon, the signals received in the antenas a, b will be equal and the voltages alternately impressed upon plates 37, 38 will be equal. In this event, the spot 40 will not change its position as the switching of the voltages between plates 37, 38 occurs. However, if the aircraft is not so oriented, as for example in the manner illustrated in Fig. 5, the antennas a, b will receive signals of different strengths and the voltages alternately supplied to the plates 37, 38 will be unequal and their deflecting effects will also be unequal, thereby causing a shifting of the spot 40 as the switching occurs. This shifting of the spot 40 will indicate to the pilot that unequal signals are being received by the antennas a, b and that the aircraft is not headed toward the source of radiations, which information will permit him to change the heading of the aircraft as desired.

Means are provided by the invention for varying the intensity of the spot of light on the screen of the oscillograph as the switching referred to hereinbefore takes place, this in order to produce a greater distinction between the alternate spots of light on the screen. Such means comprise an arrangement for alternately supplying unequal voltages to the filament 39 of the cathode ray tube and include a movable switch contact 45 which is connected to one terminal of the filament and which is operable to engage either of two fixed contacts 46, 47. A source of current 48 is provided and has a resistor 49 connected across the output thereof. One terminal of the resistor is connected to fixed contact 46 while the other terminal is grounded at 50. The second fixed contact 47 is connected to the center point of the resistor 49 by a suitable tap. The movable contact 45 is constructed and adapted to be alternately moved into engagement with the fixed contacts 46, 47 in synchronism with the switching effect of the device 32. Thus, for example, at the time when the antenna a is connected to supply energy to and through the receiver 32 to the plates 37, 38, the movable contact 45 may be moved into engagement with the fixed contact 46, at which time current at the full voltage of the source 48 will be supplied to the filament 39, thus producing a large spot of light 40 on the screen 41. At the next instant, when the antenna b is connected to supply energy to and through the receiver 32 to the plates 37, 38, the movable contact 45 will be swung into engagement with the fixed contact 47, thereby causing a reduced amount of current to be supplied to the filament 39 to accordingly produce a smaller and less distinct spot 51 on the screen 41. Any suitable means for synchronizing the movement of the switch 45 and the switching effect of the selector 32 may be provided. It will be apparent that the production of two spots of lights of different visual characteristics on the screen 41 will provide a somewhat clearer visual indication to the pilot.

The means provided by the invention for indicating the position of the aircraft with respect to the localizer beacon of a landing system may be used, in the general navigation of aircraft, to indicate the position of the aircraft with respect to the usual guidance beacons such as radio range beacons. In such case the landing beam indicating means, such as the means A of Fig. 1, need not be employed and may be disconnected by a switch means. The means C of Fig. 1, and described hereinbefore, may then be employed to provide an indication by the position of a spot of light to the right or left of line 22 on the indicating screen 21 which will denote the position of the aircraft with respect to the equi-signal course of the beacon.

The means A of Fig. 1, which provide an indication of vertical position with respect to the landing beam of a radio landing system, may be used alone and independently of the receiving and indicating means C, which latter means may be switched out of the circuit, if desired. Such use of the landing beam indicating means alone might be made in the event that the invention is used in connection with a landing system including a landing beam providing a path to earth, but not including any runway localizer beacon.

While I have illustrated and described certain embodiments of my invention, it will be apparent to those skilled in the art that further improvements and embodiments of the invention may be made and practised without departing in any way from the spirit or scope of the invention, for the limits of which reference must be had to the appended claims.

What I claim is:

1. In a radio landing system comprising transmitting means establishing radiated fields defining an equi-signal zone which provides guidance means in a horizontal plane and transmitting means for establishing a radiated field defining a line of constant field intensity which provides guidance means in a vertical plane, a plurality of spatially separated means for receiving said first-named radiated fields, means for producing from the received energy due to said fields currents which are respectively proportional in strength to the differences between the strengths of the radiated fields at the respective locations of the receiving means, means for receiving the second-named field and producing from the current so received a current which is proportional in strength to the vertical position of the receiver with respect to the line of constant field intensity, a cathode ray oscillograph having two sets of deflecting plates, means for supplying said first-named produced currents alternately to one set of deflecting plates of the oscillograph and means for supplying the second-named produced current to the second set of deflecting plates of the oscillograph, to thereby alternately produce on the screen of the oscillograph two indications, the positions of which on the screen will be functions of the strength of the second-named produced current and either of the first-named produced currents.

2. In a radio landing system comprising transmitting means establishing radiated fields defining an equi-signal zone which provides guidance means in a horizontal plane and transmitting means for establishing a radiated field defining a line of constant field intensity which provides guidance means in a vertical plane, a plurality of spatially separated means for receiving said first-named radiated fields, means for producing from the received energy due to said fields currents which are respectively proportional in strength to the differences between the strengths of the radiated fields at the respective locations of the receiving means, means for receiving the second-named field and producing from the energy so received a current which is proportional in strength to the vertical position of the receiver with respect to the line of constant field intensity, a cathode ray oscillograph having horizontal deflecting plates and vertical deflecting plates and a screen having a vertical diametrical reference line and a horizontal diametrical reference line, means for alternately supplying to the horizontally spaced deflecting plates of the oscillograph the first-named produced current to thereby produce alternate deflections of the oscillograph indication from the vertical reference line which will be respectively proportional to the differences in the strengths of the first-named radiated fields at the locations of the separated receiving means, means for supplying to the vertically spaced deflecting plates of the oscillograph the second-named produced current to thereby cause deflections of the aforesaid oscillograph indications from the horizontal reference line by amounts proportional to the vertical position of the receiver with respect to the line of constant field intensity.

3. A system for receiving two radiated fields which overlap in space to define a zone of equal signal intensity defining a path for guidance in the horizontal plane and for producing an indication of the position of a mobile station with respect thereto, comprising two antennas spaced longitudinally of said mobile station and each adapted to receive energy from both said radiated fields, means for alternately producing from energy due to said fields and received by said antennas two currents which are respectively proportional to the differences in the strengths of the two radiated fields at the locations of the two antennas, means carried by the mobile station for receiving and detecting another radiated field which defines a line of constant field intensity providing guidance in the vertical plane and for producing from energy so received a current which is proportional in strength to the vertical position of the mobile station with respect to the line of constant field intensity, a cathode ray oscillograph having horizontally spaced deflecting plates, vertically spaced deflecting plates, a horizontal diametrical reference line and a vertical diametrical reference line, means for alternately supplying to the horizontally spaced deflecting plates the two first-named produced currents to thereby produce alternate indications on the screen of the oscillograph which will be deflected from the vertical reference line thereon by an amount proportional to the differences of the two first-named radiated fields at the separated locations of the two antennas, and means for supplying the second-named produced current to the vertically spaced deflecting plates to cause a deflection of the aforesaid indications from the horizontal reference line by an amount proportional to the vertical position of the receiving means from the line of constant field intensity.

MELVILLE F. PETERS.